(No Model.)  2 Sheets—Sheet 1.

W. N. COLAM.
PULLEY CARRIER FOR CABLE TRAMWAYS.

No. 395,423.  Patented Jan. 1, 1889.

WITNESSES:
Edward C. Hammond
Arthur M. Flack

INVENTOR:
William Newby Colam.
By his Attorney.
Robt. S. D. Phillips

N. PETERS, Photo-Lithographer, Washington, D. C.

(No Model.) 2 Sheets—Sheet 2.

W. N. COLAM.
PULLEY CARRIER FOR CABLE TRAMWAYS.

No. 395,423. Patented Jan. 1, 1889.

UNITED STATES PATENT OFFICE.

WILLIAM NEWBY COLAM, OF LONDON, COUNTY OF MIDDLESEX, ENGLAND.

PULLEY-CARRIER FOR CABLE TRAMWAYS.

SPECIFICATION forming part of Letters Patent No. 395,423, dated January 1, 1889.

Application filed February 29, 1888. Serial No. 265,753. (No model.)

*To all whom it may concern:*

Be it known that I, WILLIAM NEWBY COLAM, a subject of the Queen of Great Britain, residing at London, in the county of Middlesex, England, have invented certain new and useful Improvements in Pulley-Carriers for Cable Tramways, of which the following is a specification.

My invention relates to an improvement in pulley-carriers for cable tramways, the objects being, first, to provide for the lateral adjustment of the cable supporting and guiding pulleys in the cable-way; second, to reduce the size of the hatchways in the surface of the road, and, third, to insure the perfect lubrication of the bearings of the axles of such pulleys.

With these ends in view my invention consists in mounting the pulleys in suitable bearings adapted to be mounted on pedestals or base-plates and capable of lateral adjustment thereon.

My invention further consists in certain details of construction and combination of parts, as will be hereinafter described, and pointed out in the claims.

Figure 1:
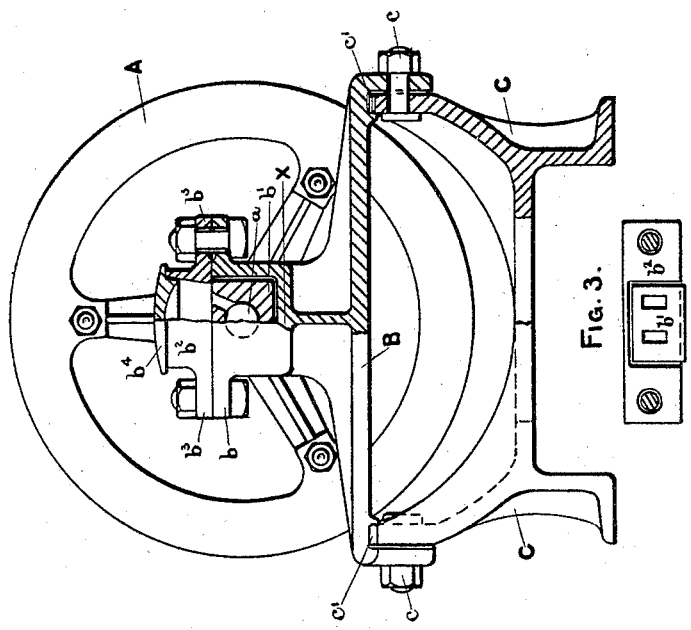
Figure 3:
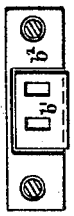
Figure 2:
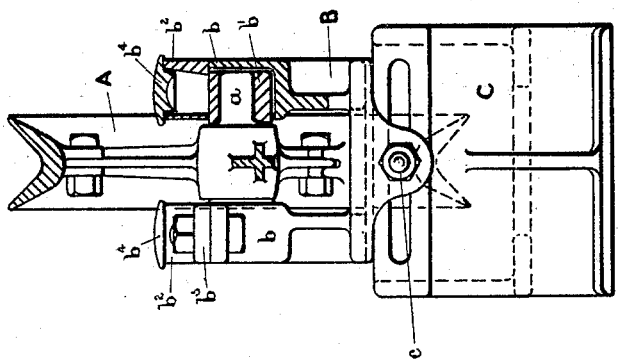
Figure 4:
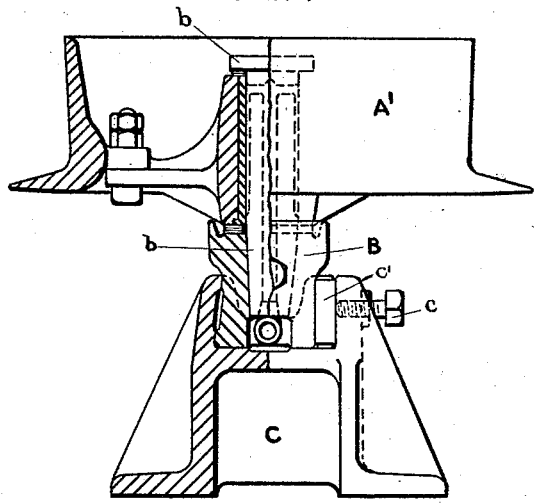

In the accompanying drawings, Figure 1, Sheet No. 1, is a view in side elevation, partly in section, of a supporting-pulley and its pedestal, embodying my invention. Fig. 2, Sheet No. 1, is an end view thereof, partly in section. Fig. 3, Sheet No. 1, is a plan of one of the bearings, showing the bearing-block. Fig. 4, Sheet No. 2, is a view in elevation, partly in section, of a guiding-pulley and its pedestal embodying my invention; and Fig. 5, Sheet No. 2, is a view of the pedestal in plan, with the pulley removed.

Throughout the views similar parts are marked with like letters of reference.

The pulley A is preferably made in two pieces, as shown, for convenience in construction and maintenance in perfect condition, the rim forming one piece and the arms and boss the other piece. In the case of a supporting-pulley, as illustrated by Figs. 1, 2, and 3, Sheet No. 1, of the accompanying drawings, the axle $a$ of the wheel is preferably made in one piece with the boss and arms of the wheel. The bearings $b\ b$ are formed on one block, B, as shown, so that they are self-contained, and the bearing-blocks $b'\ b'$ are preferably made of lignum-vitæ or other suitable hard wood when a cast-iron axle is used. The block B is shaped and adapted to fit and slide laterally on a pedestal, C, suitable locking-bolts, $c\ c$, being provided to fix the one to the other after adjustment. Strips of wood, $c'\ c'$, are preferably interposed between the block B and pedestal C to deaden the noise of the traveling cable over the pulley. To insure perfect lubrication large grease spots $b^2\ b^2$ are formed in the bearing-caps $b^3\ b^3$, and are provided with suitable caps, $b^4\ b^4$, so that the lubricant can be introduced without removing the caps $b^3\ b^3$.

Figure 5:
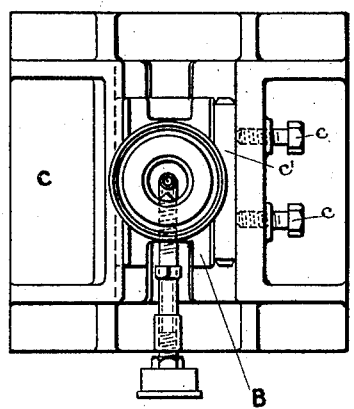

The pulley A′, for guiding the cable round curves, is mounted to run loosely on a stud-axle, $b$, carried by a block, B, adapted to fit and slide laterally on a pedestal, C, either in the manner hereinbefore described, or as illustrated by Figs. 4 and 5, Sheet No. 2, of the accompanying drawings, in which the block B and pedestal C are modified in shape, and a different method of locking the one to the other illustrated. The locking-bolts $c\ c$ are arranged to impinge on the block B or on a packing-piece, $c'$, inserted between the block B and the pedestal C, and so lock the one to the other. To insure perfect lubrication at all times I provide a passage for the lubricant through the center of the stud-axle $b$, as shown, and use a "Stauffer" or other suitable piston-lubricator to inject it.

By making the bearings of the pulleys of cable tramways independent of the pedestals, the latter may be fixed in position during the construction of the cable-way with approximate accuracy and the bearings afterward adjusted laterally, as required, to support or guide the cable. Furthermore, by making the bearings independent of the pedestals they can be more readily and easily removed or replaced and require smaller hatchways in the surface of the road than if they were made in one casting.

I would have it understood that I do not limit myself to the exact construction herein shown and described, but hold myself at liberty to make such changes and alterations as fairly fall within the spirit and scope of my invention.

Having fully described my invention, what I claim as new, and desire to secure by Letters Patent, is—

1. The combination, with a tramway-cable guide-pulley, of a block adapted to slide laterally in a horizontal straight line for supporting the said pulley, a pedestal provided with a base-flange for attachment to the foundation and a flat upper surface for supporting the said sliding block, and bolts for regulating and securing the desired lateral adjustment of the said block, substantially as and for the purpose set forth.

2. The combination, with a tramway-cable guide-pulley provided with an axle, of the bearing-blocks $b$ for the ends of the axle to run in, the laterally-adjustable block B, having bearings for the bearing-blocks and caps for securing the bearing-blocks in said bearings, the pedestal C, provided with cross-slots at each end, and the bolts passing through lugs on block B and through the said slots for regulating and securing the lateral adjustment of the said block, substantially as and for the purpose set forth.

In witness whereof I have hereunto signed my name in the presence of two subscribing witnesses.

WILLIAM NEWBY COLAM.

Witnesses:
ROBT. ED. PHILLIPS,
EDWARD C. HAMMOND.